United States Patent [19]

Schlachter

[11] 4,235,614
[45] Nov. 25, 1980

[54] METHOD AND DEVICE FOR THE MANUFACTURE OF GLASS FILAMENTS

[75] Inventor: Fredo E. L. Schlachter, Johannesberg, Fed. Rep. of Germany

[73] Assignee: Glaswerk Schuller GmbH, Wertheim Main, Fed. Rep. of Germany

[21] Appl. No.: 57,067

[22] Filed: Jul. 12, 1979

[51] Int. Cl.³ .............................................. C03B 37/02
[52] U.S. Cl. ......................................... 65/2; 65/3 R; 65/3 C; 65/12
[58] Field of Search ...................... 65/2, 3 R, 3 C, 12

[56] References Cited

U.S. PATENT DOCUMENTS

| | | |
|---|---|---|
| 3,518,069 | 6/1970 | Cole ............................................. 65/2 |
| 3,695,858 | 10/1972 | Russell ........................................ 65/2 |
| 3,829,301 | 8/1974 | Russell ........................................ 65/2 |
| 4,118,210 | 10/1978 | Watanabe et al. ........................... 65/2 |
| 4,125,387 | 11/1978 | Gunter ........................................ 65/2 |

*Primary Examiner*—Robert L. Lindsay, Jr.
*Attorney, Agent, or Firm*—Robert M. Krone; Joseph J. Kelly; William C. Anderson

[57] ABSTRACT

This invention relates to a method and apparatus for promoting the fiberization of continuous lengths of thermoplastic materials such as glass. Prior attempts to reduce fiber breakage, bushing flooding and facilitate fiberization utilized steam or a decomposable gas or gas mixture which was exposed to the heat radiating from the bushing in order to form a treatment medium. However, the prior art was plagued with poor gas distribution in the fiberization zone and thermal degradation of the structural elements constituting the treatment medium distribution system caused, in part, by the high radiant heat levels experienced proximate the bushing. The present method and apparatus comprises conducting a pressurized fluid and a vaporizable treatment liquid to a heat exchanger comprising a mixer tube located close to the bushing and a delivery tube. Radiant heat from the bushing causes the liquid to vaporize and mix with the pressurized fluid forming a treatment vapor. The vaporization of the liquid tends to cool the mixer tube reducing the thermal structural degradation of the mixer tube. The treatment vapor is conducted to the delivery tube which is removed from the radiant heat of the bushing and which has a plurality of orifices directing the vapor towards a distributor wall. In one embodiment of the apparatus, the distributor wall is formed with a plurality of openings which allow the treatment vapor to be induced into the column of filaments being formed in the fiberization zone. In a second, more preferred embodiment, the heat exchanger is mounted on a framework which is movable relative to the bushing and the fiberization zone and is provided with a distributor wall which is inclined towards the bottom of the bushing. The distributor wall may be provided with a plurality of guide vanes which direct the treatment vapor towards the filaments being drawn. Modifications to the structure of the apparatus are also disclosed.

17 Claims, 3 Drawing Figures

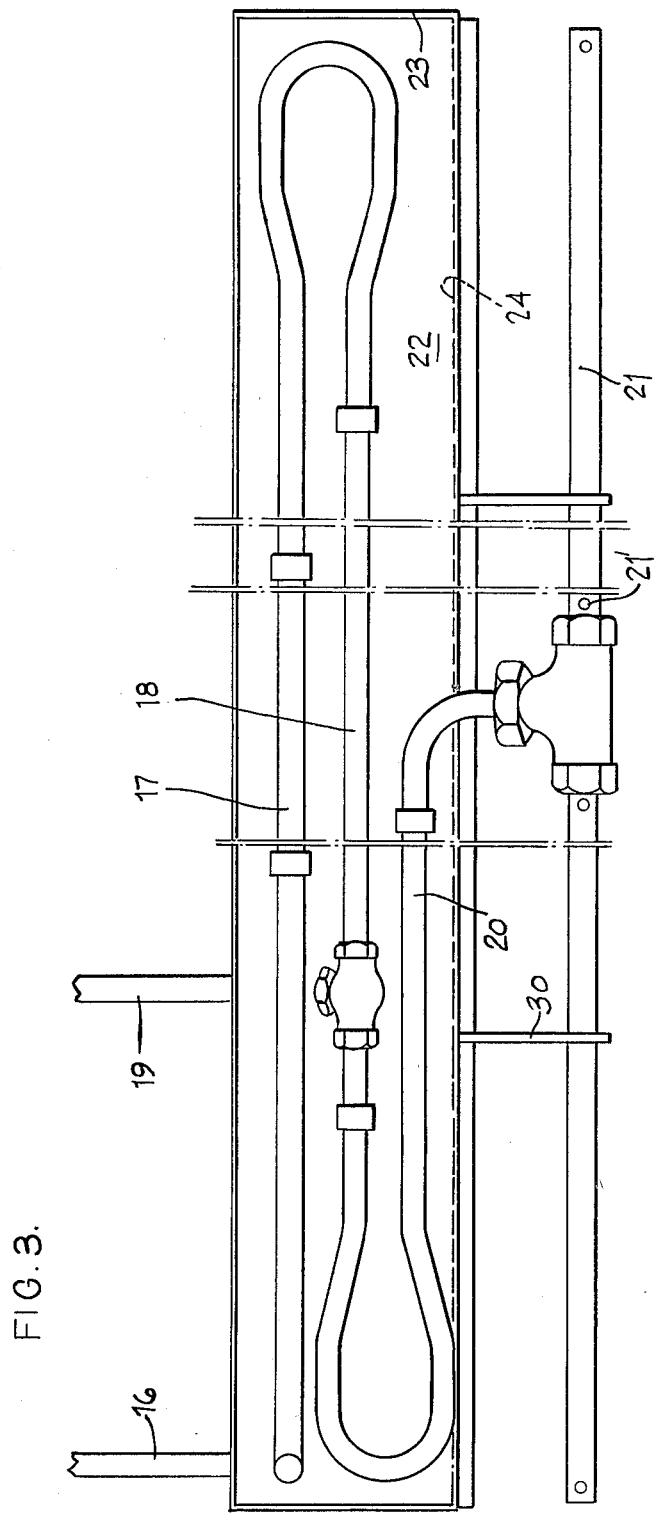

METHOD AND DEVICE FOR THE MANUFACTURE OF GLASS FILAMENTS

TECHNICAL FIELD

This invention relates to improvements in the manufacture of continuous glass filaments or other mineral thermoplastic materials and more particularly, to a method and apparatus for the manufacture of continuous filaments from streams of liquid glass which promote the drawing, stripping and/or treatment of the filaments.

BACKGROUND OF PRIOR ART

Conventionally, continuous filaments of glass are manufactured by fiberizing streams of molten glass emanating and drawn from outlet orifices or tips located at the bottom or tip plate of a bushing. The bushing is usually made of a heat resistant material and may be fed with glass either intermittently or continuously in an amount which is dependent upon the quantity of glass being fiberized by the bushing. Under rare circumstances the bushing may be fed by melting a plurality of parallel glass rods whose ends are continuously shifted towards a heating device. However, the foregoing description presupposes that the fiberizing bushing is continuously fed with glass. Molten glass flowing from the orificees or tips form a spinning cone or filament generating cone on the outside of each of the tips. The molten glass is thus divided into individual streams and forms glass filaments that are continuously drawn out by a suitable device such as a drawing drum or winder. Subsequently, the glass filaments may be further processed in order to obtain a desired final product.

It is also well known, as illustrated by German Patent Specification (DOS) No. 2,460,170 and U.S. Pat. No. 3,248,192, to conduct a gas or gas mixture, such as steam, promoting the treatment and/or drawing of filaments, to area adjoining the tips, i.e., the fiberization zone. The fiberization zone, of course, is located downstream of the tips in the direction that the filaments are being drawn and is exposed to the radiant heat of the bushing.

In order to prevent a wetting of the outside surface of the tips by the glass, DOS No. 2,211,150 discloses a method and apparatus which conducts a material containing carbon or a substance having similar characteristics to the fiberization zone. A gas or gas mixture comprising an inert gas and a comparatively small quantity of an organic gas or hydrocarbon gas aids in conducting the carbon-containing material to the tips where it may be deposited on surfaces which are not to be wetted by glass. When the two gases are decomposed by heat radiating from the busing, a hydrogen component is also released in the region of the glass streams emanating from the bushing. The generation and feed of the gas or gas mixture is effected by means of flat tubes which run longitudinally along the bushing. The flat tubes may be disposed oblique to the plane of the filaments and have upper bends which are contiguous to the tips. The upper bends have outlet slits which are closest to the tips and hence the hottest region in the fiberization zone.

The gas flow generating flat tubes are shaped like a flattened radiator-like distributor tube and unfortunately the hottest constituents of the gases tend to rise towards the slits while the colder constituents of the gases tend to sink in the tubes. Thus, the gases are distributed in the tubes such that the coldest parts of the gases tend to collect away from the distributor slits and only the substantially decomposed hot constituents of the gases flow out of the distributor slits. This is a considerable disadvantage because the colder, non-vaporizing gases may collect in the lower part of the tubes and may not be consumed continuously. Furthermore, the areas of the tubes which are closest to the hottest region of the fiberization zone carry the hottest constituents of the gases and are thus exposed to premature thermal degradation or destruction. Disassociation of the gases is also promoted by this type of arrangement.

In addition, gas distribution problems occur with such a method. The closer the gas emanating from the slits is to the tips and hence to filaments which may not have hardened, the less space and time are available for the gas to diffuse in all directions. This is caused by the fact that a column of glass filaments continuously being taken off the bushing at a high velocity creates a continuous air stream moving in a direction which is parallel to the direction in which the filaments are being drawn. This continuous air stream picks up the gas as soon as the gas comes into the area of the air stream. Thus, an even distribution of the generated gas across the entire area of the bushing cannot be ensured.

BRIEF SUMMARY OF INVENTION

Accordingly, an object of the present invention is the provision of a method and apparatus which promotes the drawing, stripping and/or treatment of glass filaments.

Another object of the present invention is the provision of a method maximizing the use of radiant heat which is available from a bushing and its associated fiberization zone.

A further object of the present invention is the provision of an apparatus which is substantially protected from the radiant heat emanating from the bushing and fiberization zone.

Still another object of the present invention is the provision of a method and apparatus promoting an even distribution of a treatment vapor which facilitates the drawing, stripping and/or treatment of filaments emanating and being drawn from a fiber forming bushing.

The present invention contemplates a method and apparatus of making continuous glass filaments in which the method comprises drawing filaments from a bushing into a fiberization zone, introducing a pressurized fluid or gas and a treatment liquid into tubes proximate an area exposed to heat radiating from said bushing and said fiberization zone in order to form a gas/liquid mixture or vapor which promotes the drawing and/or treatment of said filaments conducting said mixture at increasing distances from the proximity of the most intensely heated area exposed to radiant heat emanating from said bushing and said fiberization zone, conducting said mixture from said tubes to a fluid distributor, and blowing said mixture from said distributor into said fiberization zone. The apparatus of the present invention comprises means for receiving molten glass, said receiving means being surrounded by a heat-resistant insulating jacket; a plurality of outlet openings in said receiving means for conducting streams of glass from said receiving means, means drawing said glass streams into a fiberization zone for attenuating said glass streams into continuous filaments, a heat exchanger comprising a mixer tube and a delivery tube, said mixer tube having an inlet for a compressed gaseous fluid and a treatment liquid, said mixer tube being in fluid communication with said delivery tube and being physically closer to said receiving means and fiberization zone than said delivery tube in order to receive radiant heat from said receiving means and fiberization zone whereby said fluid and said liquid are formed into a vapor, said delivery tube being provided with a plurality of discharge openings for said vapor; and, a distributor wall for directing said vapor into said fiberization zone, whereby the fiberization of said glass streams in promoted by treatment with said vapor.

BRIEF DESCRIPTION OF DRAWINGS

The accompanying drawings show, merely by way of example, different arrangements according to the present invention, and portray the varying results obtainable thereby. In the drawings:

FIG. 3 shows an essential constituent of the apparatus illustrated in FIG. 2 seen in the direction of an arrow III in FIG. 2.

DETAILED DESCRIPTION OF INVENTION

Figure 1:
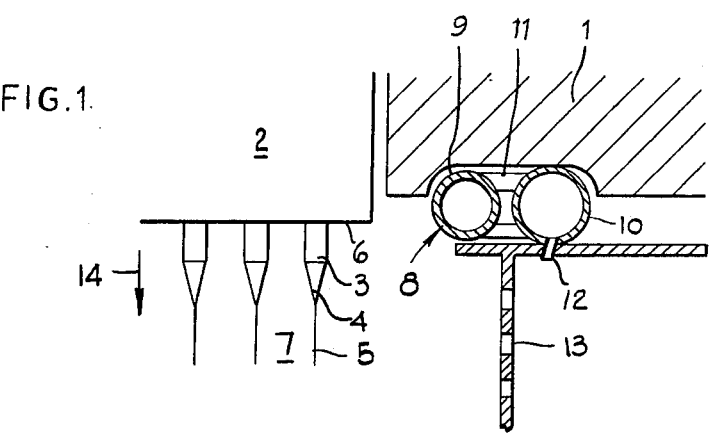
FIG. 1 is a partial vertical sectional view of an apparatus in accordance with the invention.

An apparatus implementing the method according to the invention is shown in FIG. 1 as comprising a conventional heat insulating jacket 1 (not shown in detail) held together by a sectional frame (not shown) and an orifice strip or tip plate 2 which constitutes the lower portion of a fiber-forming bushing. The jacket 1 may be made of a fire proof material such as fire proof clay and the tip plate 2 may be constructed of any suitable material such as platinum or a platinum alloy. The tip plate 2 is open at its top so that it can be fed intermittently or continuously with glass at a rate which is equal to the amount of glass being consumed to form continuous filaments. A suitable glass feeder is illustrated in DOS No. 2,326,975. The bottom of the tip plate 2 is provided with outlet openings formed in the shape of spinning orifices or tips 3. In use, a spinning cone or filament generating cone 4 is formed at the outer extremity of each of the orifices 3 so that a filament 5 may be continuously drawn from each of the cones 4 by a drawing device (not shown). Since the temperature in the tip plate 2 is between 1000° and 1250° C., and since the bottom 6 of the tip plate 2 cannot be covered by the jacket 1, the space below or down stream of the orifices 3, i.e., the spinning space or fiberization zone 7, experiences a relatively high temperature which arises from the heat radiating from the tip plate 2 of the bushing.

In order to fill the fiberization zone 7 with a treatment vapor which envelopes all of the individual filaments 5 including the filaments which are formed inside a filament column comprising a plurality of filaments 5, a heat exchanger, generally designated by a reference numeral 8, is supplied with a compressed gaseous fluid such as compressed air from a source (not shown) and a treatment liquid. The term "vapor" as used in the present application is intended to serve as a general designation of a gas or gas mixture or vaporized liquid or mist which is made to flow into the fiberization zone 7. The vapor may be generated from a treatment liquid selected from the group consisting essentially of auxiliary textile oil, an antistatic agent, water or mixtures thereof.

A treatment liquid found suitable is diethylene glycol. While not entirely understood why the vapor facilitates fiberization, it is believed that the vapor envelopes and finally settles on the filaments 5 emanating from the tip plate 2 and either lubricates the filaments or prevents an electrostatic charge from forming on the filaments.

The heat exchanger 8, illustrated in FIG. 1, is partially embedded in the underside of the jacket 1 along side the tip plate 2 and comprises at least one mixer tube 9 and a delivery tube 10 which are interconnected by a manifold 11. Compressed air of about 0.5 bar ($10^5$ newtons per square meter) and a treatment liquid, for example, diethylene glycol, are introduced into the mixer tube 9. As an alternative to mixing the compressed air and treatment liquid in the mixer tube 9, the air and liquid can be mixed before they are introduced into the tube 9. These two relatively cool media are heated in the mixer tube 9 which is disposed contiguous to the hottest region proximate the bushing and the fiberization zone 7 and are volatilized into an air/liquid mixture or vapor. This mixture will then tend to move towards the cooler area of the heat exchanger 8, i.e., the delivery tube 10, which is positioned at a distance from the fiberization zone, after which the mixture or vapor issues through a plurality of outlet or nozzle openings 12 formed along the tube 10. Taking advantage of the temperature difference between the media utilized for generating the treatment vapor and the heat exchanger allows the elements of the heat exchanger 8 lying closer to the hotter region of the bushing and fiberization zone 7 to be cooled and hence experience a longer service life.

The vapor emerging from the nozzle openings 12 strikes against a distributor surface illustrated in FIG. 1 as a perforated wall 13. The vapor is induced into the filament column constituted by filaments 5 by means of an air stream 14 which is generated by the rapidly moving filaments 5 as they are drawn from the tip plate 2. The vapor thus envelopes the individual filaments 5 promoting the drawing and/or treatment of the filaments 5 being formed.

Figure 2:
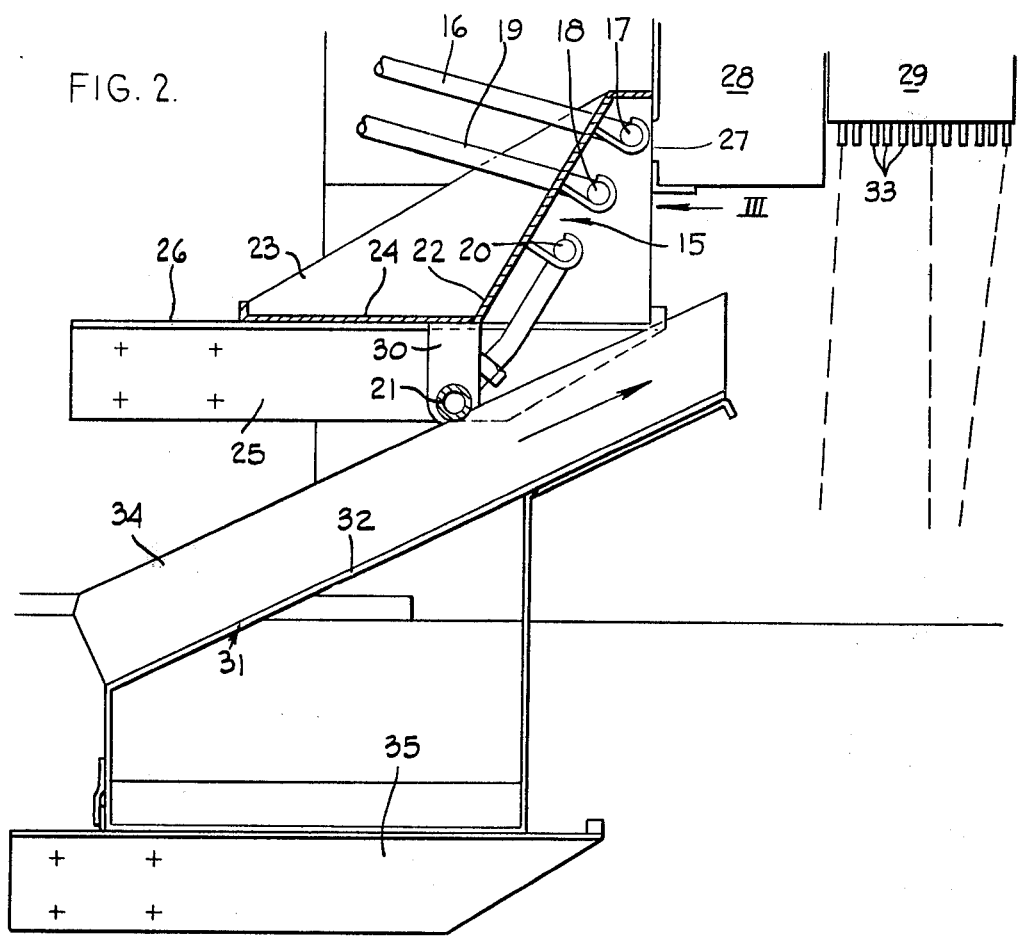
FIG. 2 is a partial vertical sectional view of an alternative and more preferred embodiment of an apparatus constructed in accordance with the invention.

In an alternative and more preferred embodiment illustrated in FIGS. 2 and 3, a heat exchanger, generally denoted by 15, is provided in which compressed air is introduced at 16 from a source (not shown). The relatively cold compressed air flows through a lead-in tube 17 and then goes into a mixer tube 18 to which a treatment fluid is introduced via a feed pipe 19. From the mixer tube 18, which performs the same function as mixer tube 8, a heated and volatized mixture of air and treatment fluid or vapor flows through an intermediate tube 20 (see FIG. 3) to a delivery tube 21 and issues from openings 21' formed in the delivery tube 21.

The tube arrangement illustrated in FIGS. 2 and 3 follows the same general principles of fluid guidance disclosed with respect to FIG. 1 in that the tubes initially receiving the relatively cool media are closest to the hotter portion of the fiberization zone and bushing while the other tubes are disposed at increasingly greater distances from the fiberizing zone and hence are protected from premature destruction caused by the deleterious effects of the radiant heat emanating from the busing and the fiberization zone. In order to dispose the tubes at increasing distances from the radiant heat, tubes 17, 18 and 20 are fastened on the outside of an obliquely projecting leg 22 of an angular support plate 23. In addition, the heat exchanger 15 is displaceable as a unit by means of rails 26 formed on a support member 25 fastened to a frame (not shown) supporting the apparatus. The plate 23 is provided with a horizontal leg 24 which can be shifted on the rails 26 until the leg 22 encounters a stop which may be the side wall face 27 of the leg 22 contacting the outside wall of a heat resistant jacket 28 surrounding a tip plate 29 of a bushing. As can be clearly seen from FIG. 2, the jacket 28 shields the tubes 16 and 17 from radiant heat emanating from the tip plate 29 of the bushing.

The delivery tube 21, which is the furthest removed vertically and horizontally from the hottest region of the fiberization zone and the tip plate 29 of the bushing, is suspended by means of brackets 30 which are attached to the underside of the horizontal leg 24 of the plate 23. The compressed air introduced via the pipe 16 loses part of its pressure as it is heated on its path from its entrance in the tube 16 to the delivery tube 21. However, the pressure of the air is sufficient to cause the mixture to move through the tubes of the heat exchanger 15 and to emerge out of the openings 21' as a vapor which is blown onto a distributor device generally denoted by a reference numeral 31.

The distributor device 31 comprises an oblique plate 32 which ascends towards the tip plate 29 and causes the vapor emerging from the openings 21' to be evenly distributed across the entire area of the bushing. Furthermore, if the orifices, designated in FIG. 2 by a reference numeral 33, are arranged in groups which have an interval wherein no orifices are present, and which has the width of one or more orifices, a plurality of ribs or guide plates 34 (see FIG. 2) can be disposed on the plate 32 in order to conduct the vapor to the grouped orifices.

As was discussed with respect to FIG. 1 the vapor ascending in the direction of the arrow shown in FIG. 2 can be induced into the fiber or filament column by the air stream generated by the filaments as they are drawn from the tip plate 29. The distributor device 31 may also be movable by means of an appropriate design which allows the device 31 to shift along brackets 35 that are fastened to the apparatus support frame.

Normally the beneficial effects of the invention are obtained if the vapor is fed from one or from both sides of the fiberization zone. However, if there are a large number of rows of orifices the vapor may not be evenly distributed through a filament column from the outside of the column to the filaments making up the center of the column. Consequently, additional delivery tubes may, according to the invention, be disposed at the midsection of the bushing below the tip plate. Outlet holes for the vapor can then be shifted to both sides of the fiberization zone and a guiding device, such as a V-shaped plate, corresponding in function to the plate 32 shown in FIG. 2, may be used to distribute the vapor to both sides of the fiberization zone.

It must be understood that the present invention is not limited to the described and illustrated embodiments but allows many variations, its scope being defined in the appended claims.

What is claimed is:

1. A method of making continuous glass filaments, comprising:
   (a) drawing filaments from a bushing into a fiberization zone,
   (b) introducing a pressurized gas and a liquid into tubes proximate an area exposed to heat radiating from said bushing and fiberization zone in order to form a gas/liquid mixture which promotes the drawing and/or treatment of said filaments,
   (c) conducting said mixture at increasing distances from the proximity of the most intensely heated area exposed to radiant heat emanating from said bushing and said fiberization zone,
   (d) conducting said mixture from said tubes to a fluid distributor, and
   (e) blowing said mixure from said distributor into said fiberization zone.

2. A method according to claim 1, wherein said mixture is a vapor which is forcefully directed against a surface of said distributor.

3. A method according to claim 1 or claim 2, wherein said liquid is selected from the group consisting of an auxiliary textile oil, an antistatic agent, water or mixtures thereof.

4. A method according to claim 1 or claim 2, wherein said liquid is diethylene glycol.

5. An apparatus for processing glass, comprising:
   means for receiving molten glass, said receiving means being surrounded by a heat resistant insulating jacket;
   a plurality of outlet openings in said receiving means for conducting streams of glass from said receiving means,
   means drawing said glass streams into a fiberization zone for attenuating said glass streams into continuous filaments,
   a heat exchanger comprising a mixer tube and a delivery tube, said mixer tube having an inlet for a compressed gaseous fluid and a treatment liquid, said mixer tube being in fluid communication with said delivery tube and being physically closer to said receiving means and fiberization zone than said delivery tube in order to receive radiant heat from said receiving means and fiberization zone whereby said fluid and said liquid are formed into a vapor, said delivery tube being provided with a plurality of discharge openings for said vapor; and,
   a distributor wall for directing said vapor into said fiberization zone,
   whereby the fiberization of said glass streams is promoted by treatment with said vapor.

6. The apparatus of claim 5, wherein said heat exchanger further comprises a feed tube for said treatment liquid communicating with said mixer tube, an inlet tube for said compressed fluid and an intermedite tube connected to said delivery tube, said mixer tube being juxtaposed between and in fluid communication with said compressed fluid inlet tube and said intermediate tube.

7. The apparatus of claim 6, wherein said receiving means is surrounded by a heat resistant jacket which insulates said receiving means and said compressed fluid inlet tube.

8. The apparatus of claim 5 or claim 6 or claim 7, wherein said delivery tube is disposed at a greater distance from said receiving means than said mixer tube.

9. The apparatus of claim 8, wherein said delivery tube is located at a greater distance substantially horizontally from said receiving means than said mixer tube.

10. The apparatus of claim 8, wherein said delivery tube is located at a greater horizontal and vertical distance from said receiving means than said mixer tube.

11. The apparatus of claims 5 or claim 6, futher comprising an angular support plate having an oblique leg which is directed towards the bottom of said receiving means and a horizontal leg supported on a plurality of bracket means, said bracket means being movable relative to said receiving means, said compressed fluid inlet tube, mixer tube and intermediate tube being attached to said oblique leg, whereby said heat exchanger is movable relative to said receiving means in order to adjust the exposure of said heat exchanger to the heat radiating from said receiving means and fiberization zone.

12. The apparatus of claim 5, wherein said distributor comprises a perforated wall exposed to said fiberization zone.

13. The apparatus of claim 11, wherein said distributor comprises a plate ascending obliquely in the direction of the bottom of said receiving means.

14. The apparatus of claim 13, wherein said distributor is displaceable relative to said receiving means.

15. The apparatus of claim 13, wherein said obliquely ascending plate is provided with a plurality of guide vanes directing said vapor into said fiberization zone.

16. The apparatus of claim 12, wherein said distributor is disposed on both sides of said fiberization zone.

17. The apparatus of claim 13, wherein said distributor is disposed on both sides of said fiberization zone.